UNITED STATES PATENT OFFICE.

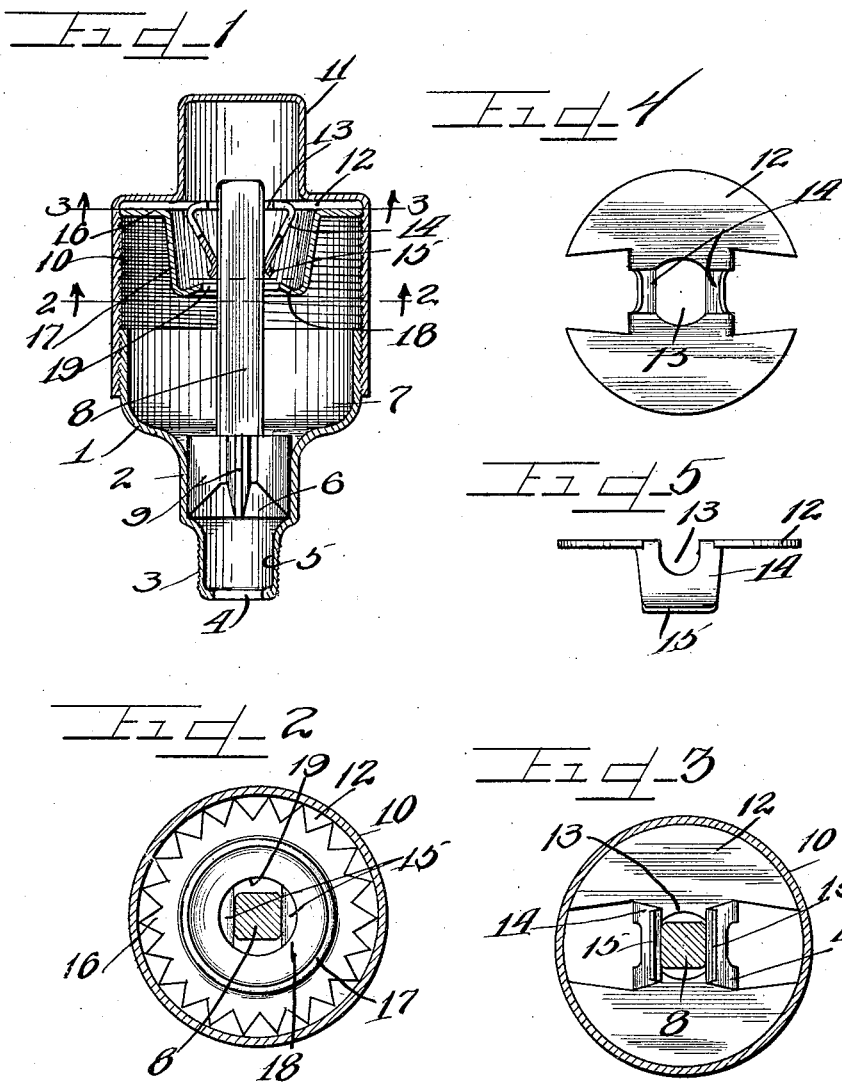

SIDNEY DAWSON, OF CHICAGO, ILLINOIS, ASSIGNOR, BY DIRECT AND MESNE ASSIGNMENTS, TO DAWSON MANUFACTURING COMPANY, OF CHICAGO, ILLINOIS, A CORPORATION OF ILLINOIS.

GREASE-CUP.

1,348,154.       Specification of Letters Patent.     Patented Aug. 3, 1920.

Application filed May 10, 1919. Serial No. 296,067.

*To all whom it may concern:*

Be it known that I, SIDNEY DAWSON, a subject of the King of England, and a resident of the city of Chicago, in the county of Cook and State of Illinois, have invented certain new and useful Improvements in Grease-Cups; and I do hereby declare that the following is a full, clear, and exact description of the same, reference being had to the accompanying drawings, and to the numerals of reference marked thereon, which form a part of this specification.

This invention relates more particularly to an improved type of grease cup wherein resilient locking members forming a part of a disk secured in the grease cup cap, are inclosed by a star retaining member, and are further adapted to frictionally engage against opposite sides of a squared alining stem secured in the outlet base of the grease cup, to hold the cap locked against accidental removal but permitting the same to be manually moved downwardly on the grease cup base to force oil therefrom.

It is an object of this invention to construct a grease cup adapted to be manually operated against a locking mechanism which serves to normally hold the grease cup cap locked against accidental operation.

A further object of the invention is the construction of a grease cup adapted to be only manually operated to cause grease to be forced therefrom.

It is also an object of this invention to provide a grease cup wherein movably interfitting grease containers are provided with manually operable controlling members which normally act to prevent one of said containers from being accidentally worked off of the other of said containers.

It is furthermore an object of the invention to construct a grease cup wherein one of a pair of interfitting grease containers is provided with a resilient plate held secured in position by a star retainer which also serves to inclose locking members struck from said resilient plate, said locking members adapted to frictionally contact a stem of the other container, so that movement of said containers with respect to one another is prevented except by manual operation of one of the containers on the other.

An important object of the invention is the construction of a simple and practical grease cup wherein resilient members in the upper grease cup container are associated with a squared or oval stem of a lower grease cup container to prevent accidental movement of said containers with respect to each other but permitting manual operation of the upper container for the purpose of ejecting grease from the lower container.

Another important object of this invention is the construction of a grease cup cap having a toothed member sprung or threaded therein for the purpose of holding two resilient friction locking members in co-acting position.

It is also an important object of the invention to construct a grease cup cap wherein a cupped star retainer is secured for the purpose of holding an apertured plate in position from which a plurality of spring locking members have been struck and bent into position to receive the squared stem of a base member therebetween for holding the grease cup cap locked against rotation.

Other and further important objects of this invention will be apparent from the disclosures in the specification and drawings.

The invention (in a preferred form) is illustrated in the drawings and hereinafter more fully described.

On the drawings:

Figure 1 is a central vertical section of a grease cup embodying the principles of this invention and showing parts in elevation.

Fig. 2 is a section taken on line 2—2, of Fig. 1.

Fig. 3 is a sectional view taken on line 3—3, of Fig. 1.

Fig. 4 is a plan view of the spring locking member removed from the grease cup cap.

Fig. 5 is a side view thereof.

As shown on the drawings:

The reference numeral 1, indicates an externally threaded metal container or cup, having integrally formed on the bottom thereof a hollow nut portion 2, of reduced diameter, on the lower end of which is integrally formed an externally threaded mounting tip or shank 3, of a diameter less than that of the nut 2. The bottom of the shank 3, is provided with an outlet opening or aperture 4, to permit the escape of grease from the grease cup. The shank 3, is provided with a chamber or passage 5, which communicates with a chamber 6, in the nut portion 2. The cup chamber designated by the reference numeral 7, together with the chamber 6, and passage 5, afford a continuous funnel-shaped passage through the integrally connected members forming the base of the grease cup.

Positioned axially within the base of the grease cup is a key comprising a squared or angular rod or stem 8, having integrally formed on the lower end thereof a brace or spider, embracing a plurality of radially directed ribs or vanes 9, adapted to be frictionally forced against the inner walls of the nut 2, to rigidly hold the stem 8, axially disposed within the grease cup base and projecting thereabove, as shown in Fig. 1. The ribs 9, afford a plurality of openings between the inner walls of the nut 2, and said ribs, to permit grease from the cup chamber 7, to pass downwardly into the chamber 6, between the respective ribs 9, and out through the shank passage 5, and the outlet opening 4, to the parts to be lubricated.

An interiorly threaded upper grease container or cap 10, is provided with a closed chambered head or hood 11, integrally formed on the upper end thereof. The cap 10, is removably threaded upon the threaded or base container 1, to telescope thereover, with the squared stem 8, projecting centrally through said cap. Rigidly sprung or threaded into the cap 10, is a one piece spring locking member comprising a circular plate or disk 12, provided with a central opening 13. Struck from two opposite portions of the disk 12, are two downwardly deflected locking springs or resilient friction tongues 14, which are bent inwardly toward one another. The free end of each locking spring 14, is bent outwardly to form a lip 15. The two lips 15, are straight and disposed parallel and opposite one another, as clearly shown in Fig. 3, to frictionally clamp against opposite sides of the stem 8, for the purpose of holding the cap 10, against rotation relative to the base member 1.

To rigidly hold the disk 12, secured within the cap 10, a retainer is provided. The retainer embraces a star or toothed washer or retainer plate 16, the middle portion of which is cupped or depressed to provide an integral cylindrical housing 17, the lower margin of which is deflected inwardly and upwardly to afford a flange 18. A middle opening 19, is provided in the bottom of the retainer housing and permits the squared stem 8, to project therethrough and through the disk opening 13, into the cap hood 11, with the lips 15, of the locking springs 14, frictionally clamping against two opposite sides of the stem 8. The star or toothed margin of the retainer plate 16, is sprung or threaded into position within the cap 10, to contact the locking disk 12, to hold the same secured in position to rotate with the cap when the same is manually operated.

When the grease cup parts are assembled as shown in Fig. 1, the frictional engagement of the locking springs 14, with the stem 8, serve to normally hold the cap 10, from accidentally rotating upwardly on the base 1, due to jarring or vibratory actions of the mechanism upon which the grease cup may be mounted.

The operation is as follows:

A grease cup of the class described is adapted to be readily mounted in position upon an engine or other mechanism requiring lubrication, by applying a wrench to the nut 2, and threading the base shank 3, into a suitable aperture provided for the purpose in the engine. The base chamber 7, and the chamber in the cap below the retainer 16—18, are next filled with grease, after which the cap 10, is threaded upon the exteriorly threaded cup portion 1, with the squared stem 8, projecting through the retainer opening 19, and engaging between the lips 15, of the locking springs 14, to hold the grease cup cap locked against accidental rotation. The locking disk 12, which is rigidly held secured within the cap 10, by the star retainer 16—18, is caused to rotate with the cap, as it is manually threaded downwardly on the base 1, against the action of the locking springs 14, which of course are sprung outwardly around the corner of the stem 8, and then inwardly to clamp against the stem sides.

The force exerted manually to rotate the cap 10, is sufficient to overcome the frictional resistance offered by the locking springs 14, so that the downward movement of the cap on the base, causes pressure to be exerted upon the grease within the grease cup, thereby forcing small quantities of the grease through the outlet opening 4, to the parts requiring lubrication. As the grease cup cap is telescoped over the base, the locking springs 14, while being rotated with the cap are also forced to slide downwardly on the squared stem 8, which projects through the locking plate opening 13, and into the cap hood 11.

It will thus be seen that the stationary stem 8, in combination with the rotatable locking springs 14, afford a means for normally locking or preventing the cap 10, from moving upwardly off of the grease cup base, due to the jarring or vibratory actions of the mechanism on which the grease cup is mounted. The grease cup cap is normally held stationary in a predetermined or adjusted position, from which it can only be rotatably moved either downwardly or upwardly by manually turning the cap 10, in the desired direction with sufficient force to overcome the frictional resistance between the locking springs 14, and the square stationary stem 8.

I am aware that numerous details of construction may be varied through a wide range without departing from the principles of my invention, and I therefore do not purpose limiting the patent granted otherwise than necessitated by the prior art.

I claim as my invention:

1. A grease cup comprising interfitting grease containers, a square alining stem secured in one container, a disk in the other container, a retainer secured in said second container for holding the disk rigidly secured in place, and locking springs struck from said disk and bent to frictionally clamp against said stem to hold said second container locked against rotation.

2. A grease cup comprising a base member, an angular stem secured thereto, internally threaded cap member, a disk in said cap, springs integral with said disk contacting opposite sides of said stem to normally hold said cap in a predetermined adjusted position against accidental rotation, and a retainer threaded in said cap for inclosing said springs and holding the disk rigidly secured within said cap.

3. A grease cup comprising a chambered base having an outlet therein, a squared key axially secured therein and projecting thereabove, a chambered cap rotatably engaged on said base inclosing said key and adapted to be manually operated to move downwardly over said base to force grease contained within said chambers from said outlet as required, a disk in said cap to be rotated therewith, cupped means secured in said cap for holding the disk rigidly secured in position, and resilient springs struck from said disk and disposed to frictionally engage said key to hold said cap stationary in an adjusted position on said base against accidental movement by jarring or other disturbing actions.

4. In a grease cup a base member, a cap member, a squared stem rigidly secured in said base member adapted to admit grease to pass through the base member, a disk in said cap member, resilient clamping springs struck therefrom to receive said stem clamped therebetween to normally hold the cap member in an adjusted position on the base member against accidental movement.

5. A grease cup comprising a cap member, a base member, a squared stem rigidly secured in the base member adapted to permit the flow of grease to pass through the base member, a disk in said cap member, locking springs struck from said disk and bent to contact against opposite sides of the squared stem to hold the cap member in an adjusted position, and a cupped retainer having star teeth integrally formed on the margin thereof to permit the retainer to be rigidly secured in said cap member against said disk to hold the disk rigidly secured in the cap member to be rotated thereby when the cap member is manually operated.

6. A grease cup comprising a base having an outlet opening therein, a stem secured therein adapted to permit passage of grease through said base, a cap adapted to be threaded upon the base, an apertured disk in said cap, an apertured cupped retainer threaded into said cap to securely hold said disk in position, said stem adapted to project through said retainer and disk, oppositely disposed springs struck from said disk, and lips integrally formed on said springs for clamping against said stem to hold said cap against movement on said base, said cap adapted to be manually rotated on said base to force grease through said outlet opening and cause said lips to frictionally rotate on said stem.

7. In a grease cup the combination with a base, a cap adjustable thereon, frictionally engaged locking members in said base and cap for holding the cap against accidental movement on said base, and a cupped and toothed retainer rigidly secured in said cap for holding one of said locking members secured in said cap in co-acting relation with respect to the other locking member.

8. In a grease cup the combination with a base, of a cap, a pair of oppositely disposed clamping springs in said cap for engaging the base, and a retainer in said cap comprising a disk, star teeth integrally formed on the margin thereof for lockingly engaging the inner wall of the cap for holding the clamping springs secured in the cap, and an apertured housing integral with said disk adapted to inclose the clamping springs.

9. The combination with a grease cup base, of a grease cup cap manually adjustable thereon, a disk in said cap, means for rigidly holding said disk secured in said cap, means axially secured in said base and resilient members on said disk adapted to frictionally engage said axial means to hold the cap in an adjusted position.

In testimony whereof I have hereunto subscribed my name in the presence of two subscribing witnesses.

SIDNEY DAWSON.

Witnesses:
EARL M. HARDINE,
CHARLES W. HILLS, Jr.